Figure 1:
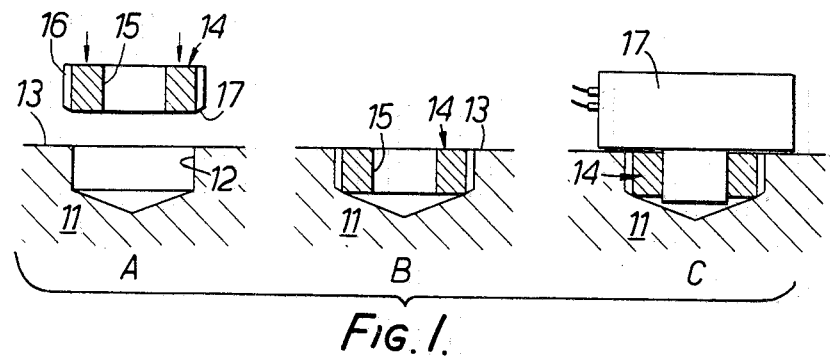

United States Patent [19]

Harbour et al.

[11] Patent Number: 4,597,154
[45] Date of Patent: Jul. 1, 1986

[54] STRAIN TRANSDUCERS

[75] Inventors: John Harbour, Chippenham; John D. Barnett, Haleston, both of Great Britain

[73] Assignee: TRW Probe Electronics Co. Ltd, Cirencester, Great Britain

[21] Appl. No.: 591,506

[22] Filed: Mar. 20, 1984

[30] Foreign Application Priority Data

Mar. 26, 1983 [GB] United Kingdom ............ 8308372

[51] Int. Cl.⁴ ..................... B23P 19/02; F16B 37/04
[52] U.S. Cl. ................................. 29/525; 411/180
[58] Field of Search ............... 411/51, 180; 29/509, 29/515, 520, 525

[56] References Cited

U.S. PATENT DOCUMENTS

| | | | |
|---|---|---|---|
| 1,884,471 | 10/1932 | Ziemann | 411/180 |
| 3,043,887 | 6/1963 | Prestige et al. | 411/180 |
| 3,125,146 | 3/1964 | Rosan | 411/180 |
| 3,201,977 | 8/1965 | Kutsay . | |
| 3,405,752 | 10/1968 | Neuskhotz | 411/180 |
| 3,498,353 | 3/1970 | Barry | 411/180 |
| 4,046,181 | 9/1977 | Barnsdale | 411/180 |
| 4,288,187 | 9/1981 | Ziaylek et al. | 411/180 |
| 4,435,887 | 3/1984 | Strandli et al. | 29/520 |

FOREIGN PATENT DOCUMENTS

| | | |
|---|---|---|
| 959352 | 6/1964 | United Kingdom . |
| 1518359 | 7/1978 | United Kingdom . |
| 2050624 | 1/1982 | United Kingdom . |

Primary Examiner—Howard N. Goldberg
Assistant Examiner—Steven Nichols
Attorney, Agent, or Firm—Yount & Tarolli

[57] ABSTRACT

A strain transducer of the kind in which a plug is inset into a workpiece surface requires an accurate interface fit with a drilled hole. One method proposes an oversize hole (12) which first receives an annular insert (14) in whose aperture (15) the transducer plug is a precision fit. The outer cylindrical surface of the insert has axially parallel serrations (16) which bite into the sides of the hole. Another method also has an oversize hole (22) whose mouth is constricted by a cylindrical punch (25) around a precision mandrel (24) which is then replaced by the transducer plug (28). Serrations (35) may alternatively be provided directly on the transducer plug (32), which can then be driven into a drilled hole (36) of only approximate accuracy.

2 Claims, 3 Drawing Figures

STRAIN TRANSDUCERS

This invention relates to strain transducers and is primarily concerned with the kind described in British Pat. No. 2,050,624B. Such a transducer has to be inset at least partially into the surface whose strains are to be measured, and this means drilling a hole to receive it. However, it is often difficult to drill accurately a precision hole matching the inset portion of the transducer, hereafter referred to as the plug, and a close interference fit is essential for proper operation. Sometimes, a difficult location is the problem.

One approach is described in British Pat. No. 959,352 which, although concerned with measuring loads normal to a surface, does employ strain gauges on a diaphragm spanning a cylindrical body. When such a body is set into a surface, the solution is to screw thread both plug and aperture. This could produce a tight fit of acceptable quality, and it is simple to form the plug with an external thread. However, if the aperture in the workpiece is difficult to drill, it will be no easier to tap it, and of course that is an extra, time-consuming step. Also, the transducer has to be screwed down hard to ensure that it does not work loose, and this could leave the plug with a residual twist which would distort the readings from the gauges. Screw-threaded fitting is also contemplated in British Pat. No. 2,050,624B, with the added complication of chamfering the mouth of the hole and making the root of the plug frustoconical.

Another problem arises when measuring strains in the plane of the surface of the workpiece, namely that the gauges must be oriented accurately, for example in the longitudinal direction of an elongated workpiece, and exactly transverse thereto. With screw-threaded engagement, it would be fortuitous if the tightened down transducer presented the gauges in the correct attitude. Alterations could be made by removing the transducer and putting shims between its flange and the surface of the workpiece, but that would be a difficult and lengthy process, and would also bring the gauges out of the plane of the surface. It would not be practical instead to fix the gauges to the diaphragm after the transducer had been screwed in.

Another solution, as described in British Pat. No. 1,518,359, is to secure the transducer with adhesive. This is messy and inconvenient, and tends to disguise any mismatch between the plug and aperture. If the latter is slightly oversize, or coned for example, the adhesive will fill the gap, but its character could give a cushioning effect and prevent the true strains being transmitted to the transducer.

It is the aim of this invention to provide means for overcoming these drawbacks. It is important that the cylindrical member should be tightly fitted, and the gauges oriented as desired.

According to one aspect of the present invention there is provided a method of mounting a strain transducer with a plug inset into a workpiece surface, wherein an oversize hole is drilled to receive the plug, an insert is fitted into the hole, and the plug is entered into a precision aperture in the insert.

The insert will generally be annular, and its outer cylindrical surface may have axially parallel serrations that cut into the side of the original hole as the insert is driven in by a hammer or other percussion tool. The oversize hole will normally be drilled several millimeters larger than the hole that is finally required, so that the insert will have a substantial wall thickness. Measures will be taken to protect the lip of the precision aperture so that it is not distorted by the impacts driving the insert home.

According to another aspect of the present invention there is provided a method of mounting a strain transducer with a plug inset into a workpiece surface, wherein an oversize hole is drilled in said surface to receive the plug, the periphery of the hole is closed against a precision mandrel, and the mandrel is replaced by the plug.

In a preferred form, the mandrel is surrounded by a cylindrical punch, and percussion thereon causes constriction of the hole periphery around the mandrel.

The punch will generally have a bevelled working end, the slant being back from the outer edge. The hole need be drilled oversize only very slightly.

Since we are concerned with measuring strains at the surface of the workpiece, it matters not that the plug may not be in contact with the hole throughout its length. By this method, it will be gripped tightly at the surface.

According to a further aspect of the present invention there is provided a strain transducer with a cylindrical plug for insetting into a workpiece surface, wherein the outer face of the plug is formed with axially parallel serrations to cut into the side of a hole drilled in said surface and provide an interference fit.

As with the method using a separate insert, the hole itself need not be drilled with fine accuracy. The transducer will of course be designed to withstand the impacts necessary to drive it into position.

In all cases no twisting action is imparted to the transducer, which can be set up before being driven in with the strain gauges correctly oriented. The versions with axially parallel serrations are particularly good for keeping angularly stable.

Figure 2:
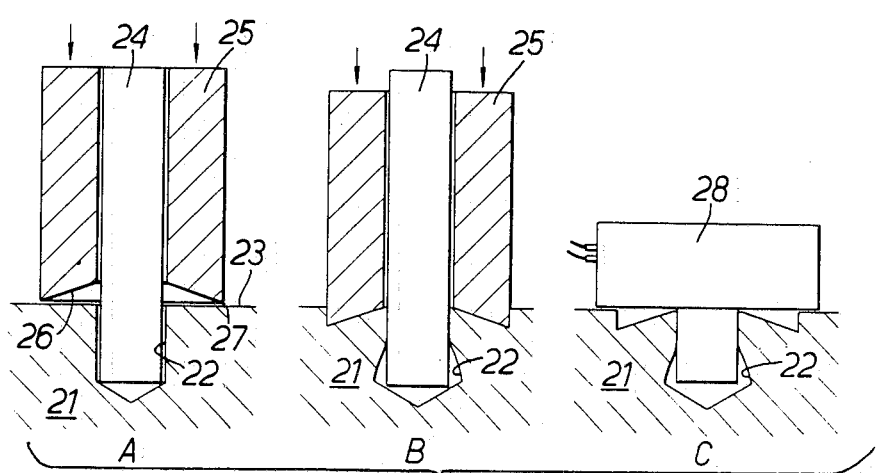
Figure 3:
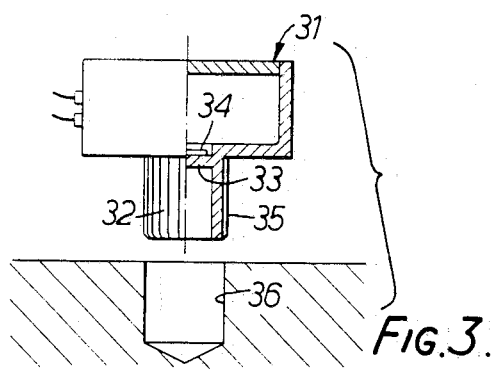

For a better understanding of the invention, some embodiments will now be described, by way of example, with reference to the accompanying drawing, in which:

FIG. 1 shows stages in the fitting of an insert in a workpiece to receive a strain transducer, FIG. 2 shows stages in the formation of a hole for receiving the strain transducer, and FIG. 3 is a part side elevation, part vertical section, of a strain transducer.

In FIG. 1, a workpiece 11 has a hole 12 drilled normally into its surface 13. This hole is several millimeters greater in diameter than that of the plug of a strain transducer such as described in British Pat. No. 2,050,624B. An insert 14 in the form of a ring with a precision aperture 15 exactly matching the diameter of the transducer plug provides an intermediate member between the hole and plug. The external surface of the insert has axially parallel serrations 16 whose peak envelope is slightly greater in diameter than that of the hole 12, while the root envelope is slightly less. The ends of the serrations to enter the hole first may be angled as shown at 17 to help initial location and subsequent fitting.

Stage A of FIG. 1 shows the insert 14 being offered up to the hole 12, while in stage B it has been driven in so that its upper surface is flush with the surface 13. The serrations 16 cut into the cylindrical wall of the hole 12 and the material of the workpiece cold flows into the valleys between serrations. The insert is thus securely held, with firm engagement all around its periphery, so that surface strains are transmitted to the transducer 17 which is then fitted in the aperture 15, as shown by stage C.

Fine accuracy of the hole 12 is not critical, provided that the serrations can achieve a reasonable 'bite'.

In FIG. 2, a workpiece 21 has a hole 22 drilled normally into its surface 23, this hole being just slightly oversize in relation to the diameter of the transducer plug which it is to receive.

A precision mandrel 24 whose cylindrical surface exactly matches that of the transducer plug is then inserted in the hole 22 as shown in stage A of FIG. 2, and a cylindrical punch 25 is sleeved over it. The annular working end 26 of this punch, which comes in contact with the surface 23, is bevelled, sloping back from the outer periphery 27.

One or more impacts are then applied to the reverse end of the punch 25, as indicated by the arrows. A vibrating tool with an annular hammer head might be used. This drives the punch 25 into the surface 23 as shown in stage B of FIG. 2, deforming the lip of the hole 22. The bevel causes the material of the workpiece 21 to cold flow radially inwards and close about mandrel 24. Thus, at the surface 23, the hole 22 will have a diameter exactly matching that of the transducer plug. The mandrel and punch are then removed, and replaced by the transducer 28 as shown at stage C.

The principle of FIG. 1 can be applied directly to a transducer 31, as shown in FIG. 3. The transducer has a cylindrical plug 32 spanned by a diaphragm 33 with strain gauges 34 bonded thereto. The exterior of this plug has axially parallel serrations 35 similar to the serrations 36 of FIG. 1, and can be driven directly into a hole 36 to achieve the necessary interference fit.

We claim:

1. A method for securing a strain gauge to a member, said method comprising the steps of:

providing a cylindrical plug having a predetermined diameter;

securing said strain gauge to said plug;

providing an insert having axial serrations extending substantially the entire length thereof with a predetermined envelope peak diameter and having an interior aperture having a diameter equal to said predetermined diameter of said cylindrical plug;

drilling in said member a hole having a diameter less than said predetermined envelope peak diameter;

driving said insert into said hole in said member and causing said serrations to cut into a wall defining said hole thereby preventing axial rotation of said insert during said driving;

positioning said cylindrical plug while external of said insert aperture to provide a predetermined orientation between said strain gauge and said member; and thereafter moving said cylindrical plug into said interior aperture of said insert with solely linear movement.

2. A method for securing a strain gauge to a member comprising the steps of:

providing a cylindrical plug having exterior axial serrations extending substantially the entire length thereof with a predetermined envelope peak diameter;

securing said strain gauge to said plug;

drilling in said member a hole having a diameter less than said predetermined envelope peak diameter;

positioning said plug while external of said hole to provide a predetermined orientation between said strain gauge and said member; and thereafter driving said plug into said hole and causing said serrations to cut into a wall defining said hole thereby preventing said plug from rotating about its axis during said driving and preventing change of said orientation.

* * * * *